United States Patent [19]

Goldman et al.

[11] 4,225,987
[45] Oct. 7, 1980

[54] VARIABLE VOLUME CONTROL FOR TOILET FLUSH TANKS

[76] Inventors: Harley R. Goldman, 8 Russell Dr., Mineola, N.Y. 11501; Stewart Hall, 138-10 Jewel Ave., Flushing, N.Y. 11367

[21] Appl. No.: 72,284

[22] Filed: Sep. 4, 1979

[51] Int. Cl.² .......................... E03D 1/24; E03D 5/02
[52] U.S. Cl. ............................................ 4/325; 4/324
[58] Field of Search ................ 4/325, 324, 388, 391, 4/355, 356, 392

[56] References Cited

U.S. PATENT DOCUMENTS

| | | | |
|---|---|---|---|
| 1,780,810 | 11/1930 | Brown | 4/326 |
| 2,001,390 | 5/1935 | Lester | 4/325 |
| 2,532,977 | 12/1950 | White | 4/325 |
| 2,724,838 | 11/1955 | Wirth et al. | 4/325 |
| 2,741,776 | 4/1956 | Christie et al. | 4/324 |
| 2,869,141 | 1/1959 | Koch et al. | 4/388 |
| 2,883,675 | 4/1959 | Hartman, Jr. | 4/324 |
| 3,005,206 | 10/1961 | Dollinger | 4/327 |
| 3,320,622 | 5/1967 | Wustner | 4/325 |
| 3,324,482 | 6/1967 | Wustner | 4/325 |
| 3,331,084 | 7/1967 | Wustner | 4/325 |
| 3,365,730 | 1/1968 | Chiappetta | 4/325 |
| 3,546,715 | 12/1970 | Wustner | 4/325 |
| 3,590,395 | 7/1971 | Wustner | 4/324 |
| 3,733,618 | 5/1973 | Wiegand | 4/393 |
| 3,744,064 | 7/1973 | Preston | 4/325 |
| 3,812,545 | 5/1974 | Lanahan | 4/324 |
| 3,858,250 | 1/1975 | Coglitore | 4/324 |
| 4,000,526 | 1/1977 | Biela et al. | 4/394 X |
| 4,056,856 | 11/1977 | Reid et al. | 4/326 |
| 4,115,880 | 9/1978 | Gruenhagen | 4/325 |
| 4,149,283 | 4/1979 | Knudtson | 4/324 |
| 4,171,547 | 10/1979 | Raz | 4/326 |

*Primary Examiner*—Henry K. Artis
*Attorney, Agent, or Firm*—Brumbaugh, Graves, Donohue & Raymond

[57] ABSTRACT

A water saving apparatus for a tank flush mechanism in which the trapped air in the flush discharge valve is vented to terminate the flush when the water level in the tank drops to a predetermined level. A pair of water level responsive actuators, set to respond at different water levels, cooperate with a normally closed vent valve coupled to the air chamber in the flush discharge valve. As the water level in the tank drops after a flush is initiated, the actuator set at the higher level in the tank will normally respond first to open the vent valve to exhaust the air from the discharge valve and terminate the flush. To provide a large volume flush, the higher level responsive actuator is rendered non-responsive by the user's manipulation of the flush handle, thereby allowing the flushing action to continue until the other actuator responds to the falling water level to open the vent valve.

20 Claims, 15 Drawing Figures

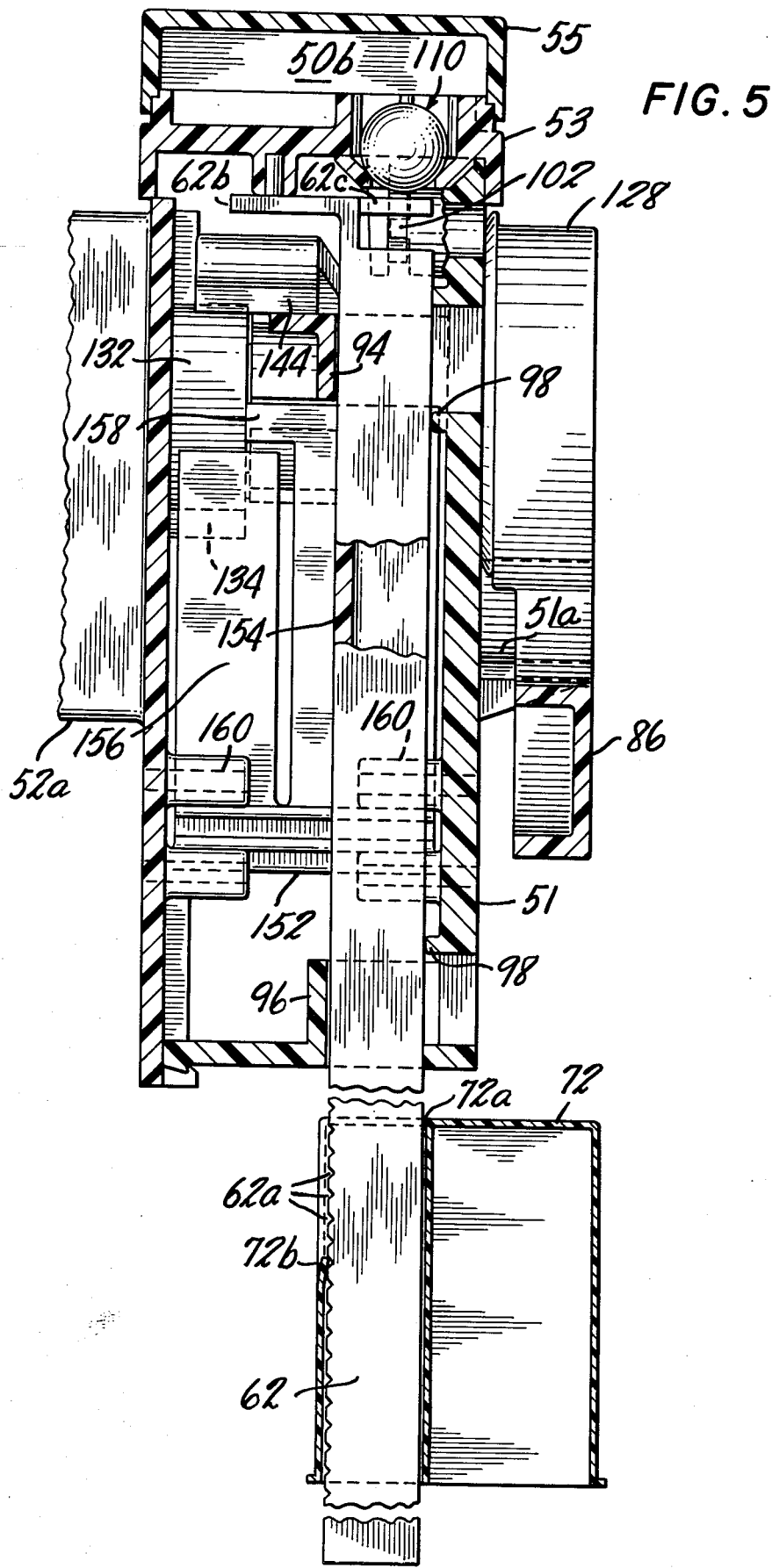

VARIABLE VOLUME CONTROL FOR TOILET FLUSH TANKS

BACKGROUND OF THE INVENTION

This invention relates to water saving toilet flush tanks, and more particularly to a variable flush control apparatus which is readily adapted for installation in a conventional flush tank to provide for easy adjustment of the level or levels at which the tank discharge valve will reseat to limit the quantity of water discharged during each flush.

Conventional flush tanks now in general use discharge the entire amount of water stored in the tank upon each flushing operation even though only a fraction of that quantity of water may be required for flushing the waste material. This results in unnecessary water consumption, increased water costs and presents special problems where the water is flushed into a cesspool or septic tank. In many places there is a critical shortage of water, and this waste contributes significantly to the shortage. In addition, many municipal waste disposal systems are already overburdened with the increasing quantities of sewerage water that flows through the sewer systems and treatment plants.

It has long been recognized that substantial water saving can be achieved by the provision of a variable flushing control for varying the quantity of water utilized in flushing in accordance with the quantity and character of the waste material to be flushed. Toward this end, various water saving flush tanks and variable flushing control devices have been proposed in the past.

One type of flush tank heretofore proposed includes a partitioned tank, separate water discharging devices and duplication of plumbing for discharging water from one or both parts of the partitioned tank. In another type, the discharge of water from the tank is controlled by two columns in end-to-end relationship with provision for lifting the upper column for a partial flush and both columns for a full flush.

Other types of variable flushing control devices have been proposed which rely on the venting of air from the conventional hollow ball valve to effect a partial flush. For example, in the variable flushing control device described in the Christie et al U.S. Pat. No. 2,741,776, a tube supporting a ball-type discharge valve has a positively actuated valve at the upper end thereof to partially exhaust air from an air chamber within the ball valve when the ball valve is lifted to bring the valve into contact with an actuating bar. The partial evacuation of the air from the ball valve permits gradual reseating of the ball valve upon release thereof. A number of other systems using the venting principle have been devised, but in general, these prior art proposals employ complicated and expensive structures and are not adapted for use in conventional flush tanks.

SUMMARY OF THE INVENTION

The present invention provides a novel, improved apparatus for controlling the volume of water flushed from a flush tank which may be readily attached to a conventional flush tank mechanism.

Such flush tank mechanisms generally employ a discharge or ball valve which has an air chamber open at the bottom, to provide buoyancy during the flushing operation. This air chamber ensures that the discharge valve is buoyed up by the water in the tank before it reseats, so that all of the water in the tank is discharged during the flush operation. The flush control apparatus of the present invention vents the air from the chamber in the discharge valve when the water level in the tank falls to a predetermined height or heights short of the bottom of the tank, so that the discharge valve may immediately reseat and stop the discharge of water. Thus, a preselected amount of water, less than a full tank, may be used for each flushing operation, thereby saving water. A prior arrangement of this general type is described in copending application Ser. No. 840,573, filed Oct. 11, 1977, in the name of Harley R. Goldman, one of the present inventors.

The apparatus of the present invention preferably would be provided in substantially assembled form and can be readily mounted in existing toilet tanks without significant change to conventional flushing mechanisms. The principal assembly is encased in a slim housing adapted to be mounted within the tank on its inner front wall by means of a threaded tube dimensioned to extend through the hole in the tank wall provided for the shaft of the conventional flush handle. The latter is removed from the tank before insertion of the apparatus of the invention. Suitable actuating handles operate concentric shafts extending through the tube to the control mechanism within the housing. These handles, interrelated in a novel manner, enable simple selection of either a small or large volume flush by a simple, downward push, in much the same manner as conventional flush mechanisms are operated.

In accordance with a preferred embodiment of the invention, the housing mounted in the tank includes a vent means which is interposed in an air passage coupling the air chamber in the discharge valve to the atmosphere. At least one, but generally two, float carrying rods extend downwardly from the housing and are free to move in a vertical direction in accordance with the water level in the tank. Each of these rods has a float mounted at an adjustable, preselected point along its length and is limited in its vertical movement by the housing within which its upper end moves. When the water level in the tank drops below the level of the float on a particular rod during a flush, that rod is free to fall with the water level. The resultant downward movement of the member actuates a mechanism which then opens the vent, thereby allowing air to escape from the chamber in the discharge valve and causing its immediate reseating to stop the flush discharge.

To permit two different flush volumes to be selectively available, means are provided, actuatable at will by simply manipulation of the flush handle, to lock up one of the members against downward movement so that when the water level in the tank drops below its associated float, that member does not drop with it. The vent means, therefore, is not opened, maintaining the discharge valve floating until the water level drops to a level above the bottom of the tank, but below the level established by the float on the locked-up member, as determined by the level of the float on the second member. The second member is coupled through a comparable mechanism to open the vent means when it falls in response to a drop in the water level below its float level. In an alternate embodiment, the second float rod and associated structure is dispensed with and the large volume flush uses the full tank as in a conventional flushing operation.

BRIEF DESCRIPTION OF THE DRAWINGS

For a full understanding of the present invention, reference should be made to the detailed description which follows and to the accompanying drawings, in which:

FIG. 5 is a vertial section through the mechanism of the invention, taken along the line 5—5 of FIG. 3;

DESCRIPTION OF THE PREFERRED EMBODIMENTS

Figure 1:
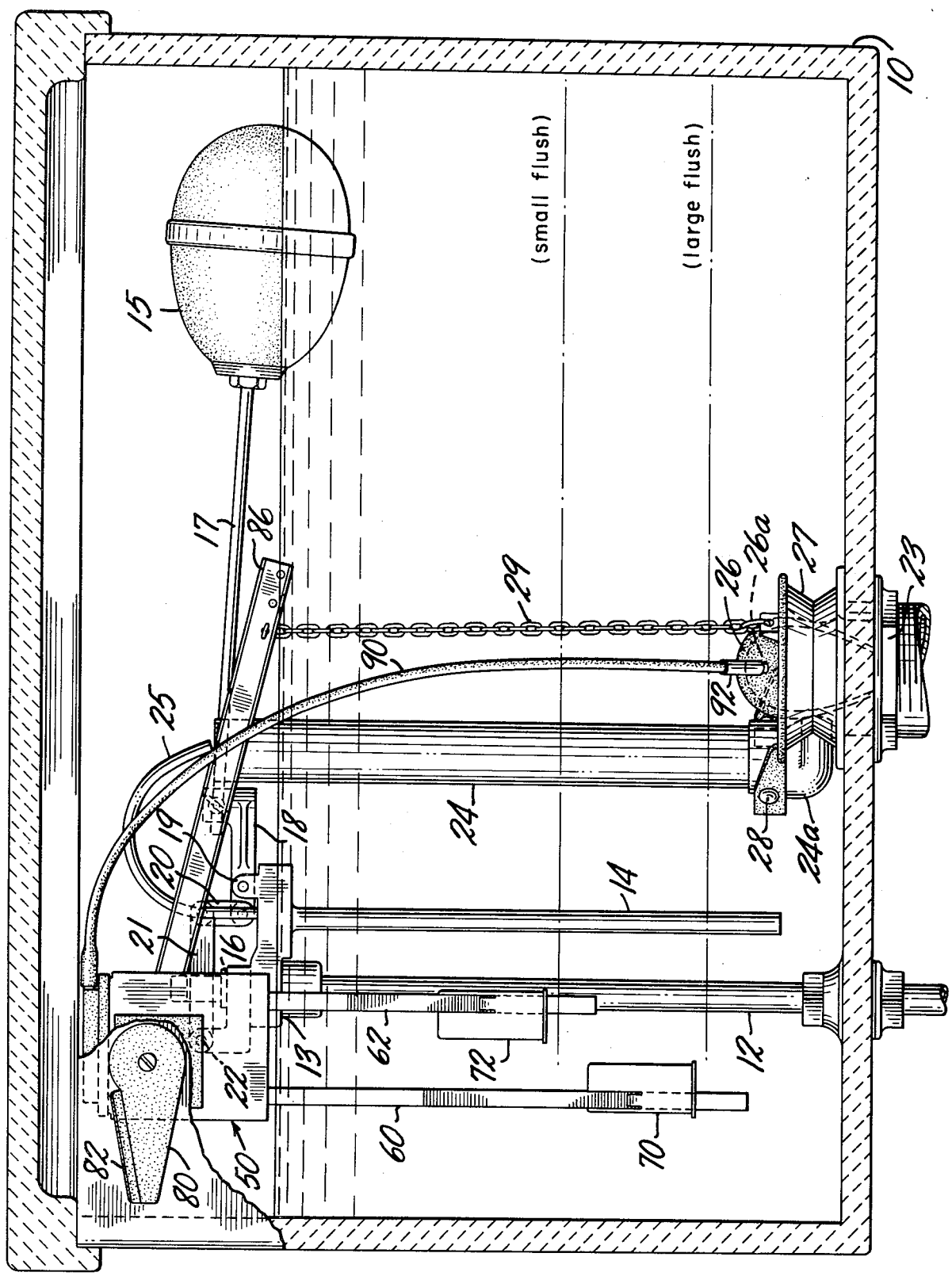
FIG. 1 is a partial vertical section through a conventional toilet flush tank showing the positioning of the mechanism of the present invention in the tank.
Figure 2:
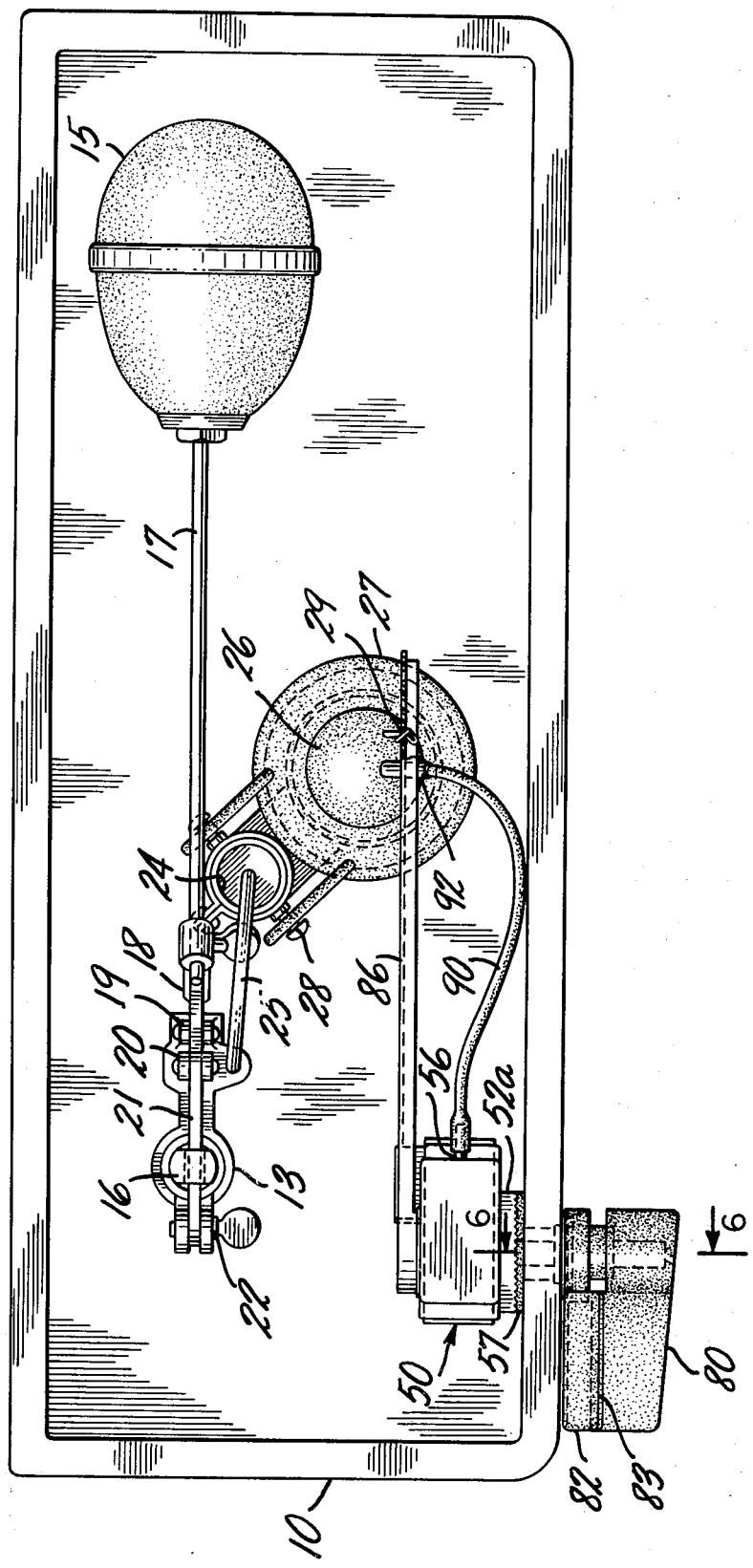
FIG. 2 is a plan view of a flush tank showing the present invention in position.

FIGS. 1 and 2 of the drawings illustrate a conventional flush tank and flush mechanism with the apparatus of the present invention shown in place.

The flush tank 10 contains a water supply conduit 12 having a valve housing 13 at the upper end containing a valve through which water is discharged into the tank through a fill pipe 14. The valve is controlled in the usual way by a float 15. The float 15 is connected to the actuator 16 of the valve through an operating linkage which includes a rod 17, a rocker arm 18 pivotally mounted at 19 to the valve housing and connecting links 20 and 21. The link 21 is pivotally mounted at 22 to the valve housing and the link 20 connects the free end of the link 21 and an end of the rocker arm. The float controlled valve thus admits water to the tank when the float drops below a certain level and shuts off the flow of water to the tank when the float rises back to the level.

The tank contains a discharge port 23 at the bottom which communicates with the toilet bowl (not shown) to be flushed. An upright conduit 24 open at the top discharges water from a fill pipe 25 through the discharge port 23 to fill the toilet bowl. The discharge port 23 is normally closed to prevent discharge of water from the lower region of the tank, but the elbow 24a at the lower end of the upright conduit by-passes the closure.

The discharge of water from the lower region of the tank is controlled by a pivotal ball-type discharge valve 26 which engages a valve seat 27 surrounding the discharge port. The discharge valve 26 is pivotally mounted at 28 from the elbow 24a. The discharge valve 26 is lifted to discharge water from the tank by a chain 29 connected at its upper end to the free end of a pivotal arm or trip lever 86. In conventional flush mechanisms, the trip lever 86 is raised by depressing an actuating handle on the outside of the tank which is coupled through the tank wall to the end of the arm. As will be described in detail below, when employing the apparatus of the present invention with the conventional tank structure, the usual single flushing handle is replaced by a pair of cooperating handles, one of which operates the trip lever.

The discharge valve 26 has a hollow interior forming a chamber 26a open at the bottom so that it is in open communication with air in the closed position. When lifted to discharge water from the tank, the flow of water through the discharge port traps air within the chamber and maintains the valve in floating condition unitl the discharge of water from the tank has been completed, at which time the valve is permitted to reseat and the tank and bowl are then refilled through the fill pipes 14 and 25, respectively. When the water in the tank lifts the float 15 to its valve closing position, the refilling operation is completed.

The apparatus of the present invention regulates the amount of water flushed from the tank during each flushing operation by venting the chamber 26a of the discharge valve before the water level drops to the bottom of the tank. As the air exhausts from the chamber, it fills with water and reseats, thereby ceasing further discharge of water from the tank and ending the flushing operation.

The apparatus of the invention is preferably preassembled into a single assembly which may be readily inserted into a toilet tank with minimum difficulty. The assembly comprises a housing, indicated generally by the numeral 50, which is supported from the inner wall of the tank by means of a tubular extension adapted to fit through the hole normally provided for the shaft to which the conventional flush handle is connected. As will be described more fully hereinafter, means are provided for use in conjunction with the tubular extension to firmly secure the entire assembly to the tank wall in a simple effective manner.

Extending from the upper portion of the housing 50 is a flexible air tube 90 which enters through the upper surface of the discharge valve 26 into the air chamber 26a. The lower end of the tube 90 may be fitted with a sleeve of hard plastic 92 having a pointed end, which may be simply pushed through the soft rubber of which many conventional discharge valves are made to complete the connection. Alternatively, threaded or other types of connectors may be provided as appropriate to suit the material and construction of the discharge valve. Similarly, at its upper end, the air tube 90 may be coupled to the housing 50 by frictional engagement with a suitably sized nipple or other connector.

In place of the conventional single flush handle found on tank toilets, two separate actuating handles, 80, 82, are provided in accordance with the present invention.

Figure 6:
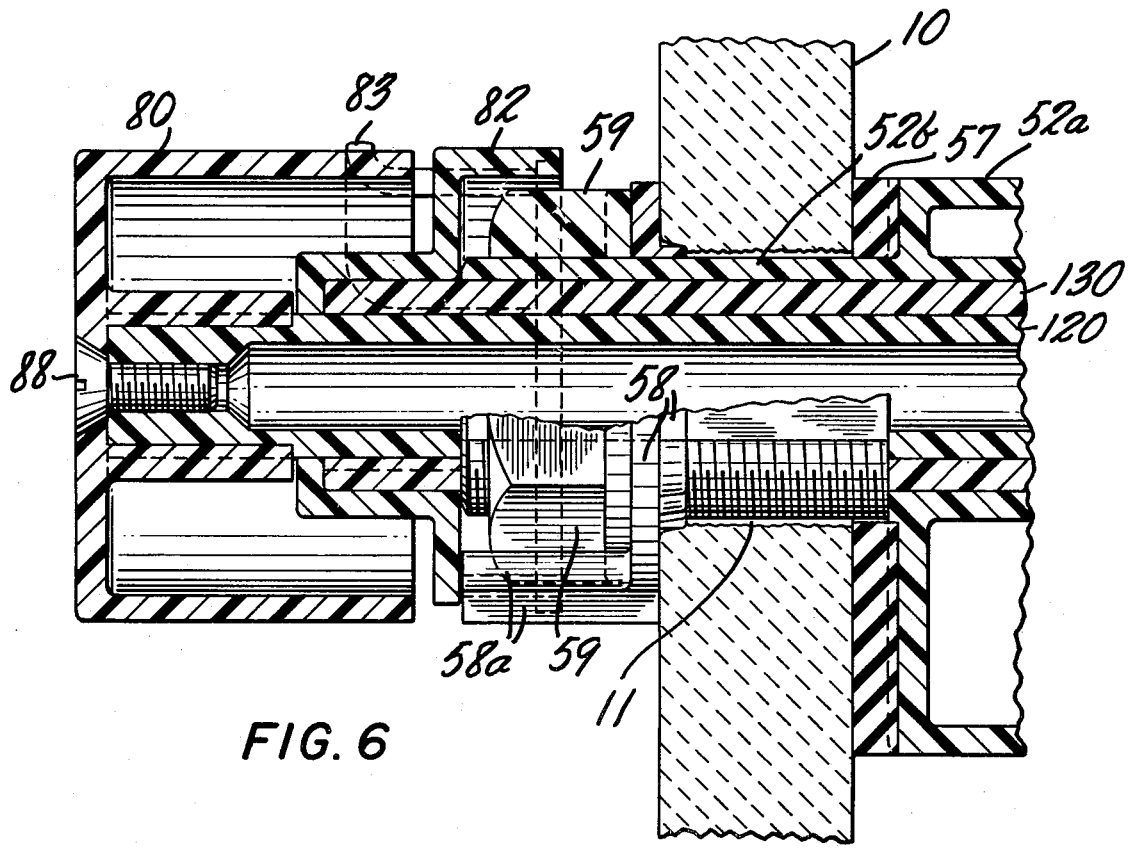
FIG. 6 is a partial section taken along the line 6—6 of FIG. 2.

As is best seen in FIGS. 2 and 6, the handle 80 is forward of the handle 82 and of substantially greater size. The large handle 80 is employed to provide the small volume flush. Making this handle of relatively larger size and locating it forward of the handle 82 provides for easy selection of a short flush when desired. To obtain a large flush, the handle 82 must be depressed. As seen best in FIG. 2, the flush handle 82 includes a curved lip portion 83 extending forwardly of the main part of the handle and overlaying the forward handle 80. Consequently, depressing the flush handle 82 necessarily causes depression of the handle 80 associated with the small flush operation. The handle arrangement enables the user to readily distinguish between small and large flush operation, both visually and tactilely.

Extending downwardly from the bottom of the housing are a pair of vertical rod members 60, 62, which carry floats 70, 72, respectively, each in the form of a hollow, inverted cup. One longitudinal surface of each of the rod members 60, 62, is provided with grooves or teeth which cooperate with a detent provided on the float so that the latter may be moved along the length of the member, but firmly retained in any position desired. As will be seen, the positions of the floats on the members 60, 62 determine the amount of water discharged during a flushing operation.

Figure 7A:
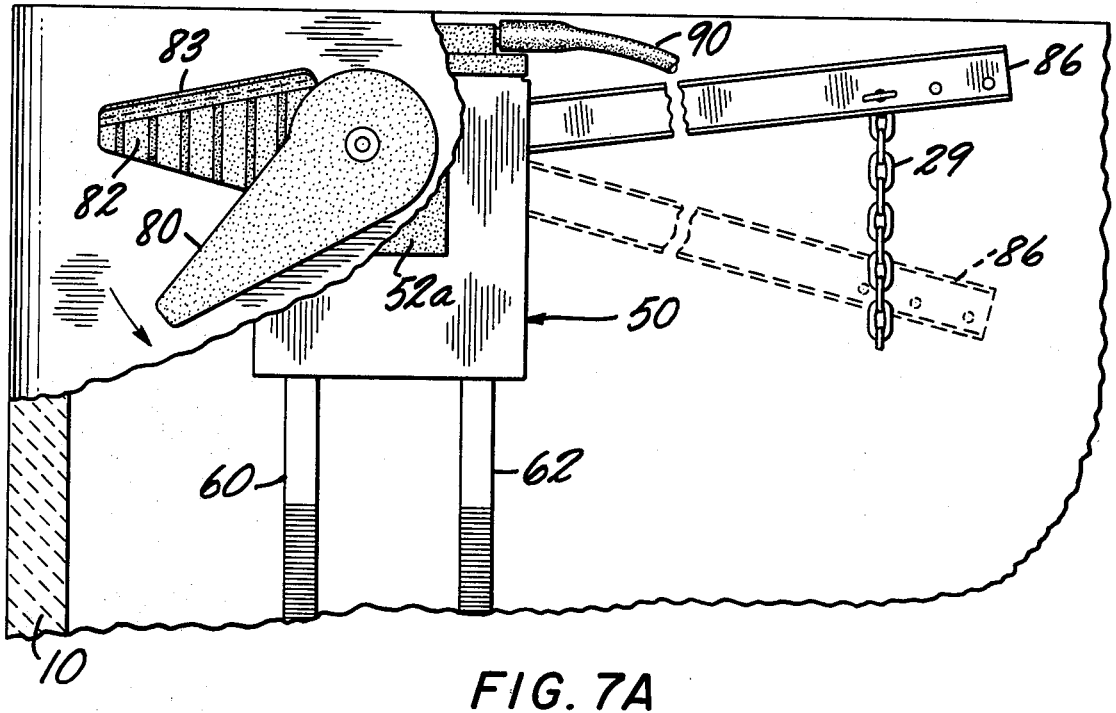
FIGS. 7A and 7B illustrate a portion of a toilet tank, in partial section, indicating the operation of the flush handles of the invention in the partial and full flush modes.
Figure 7B:
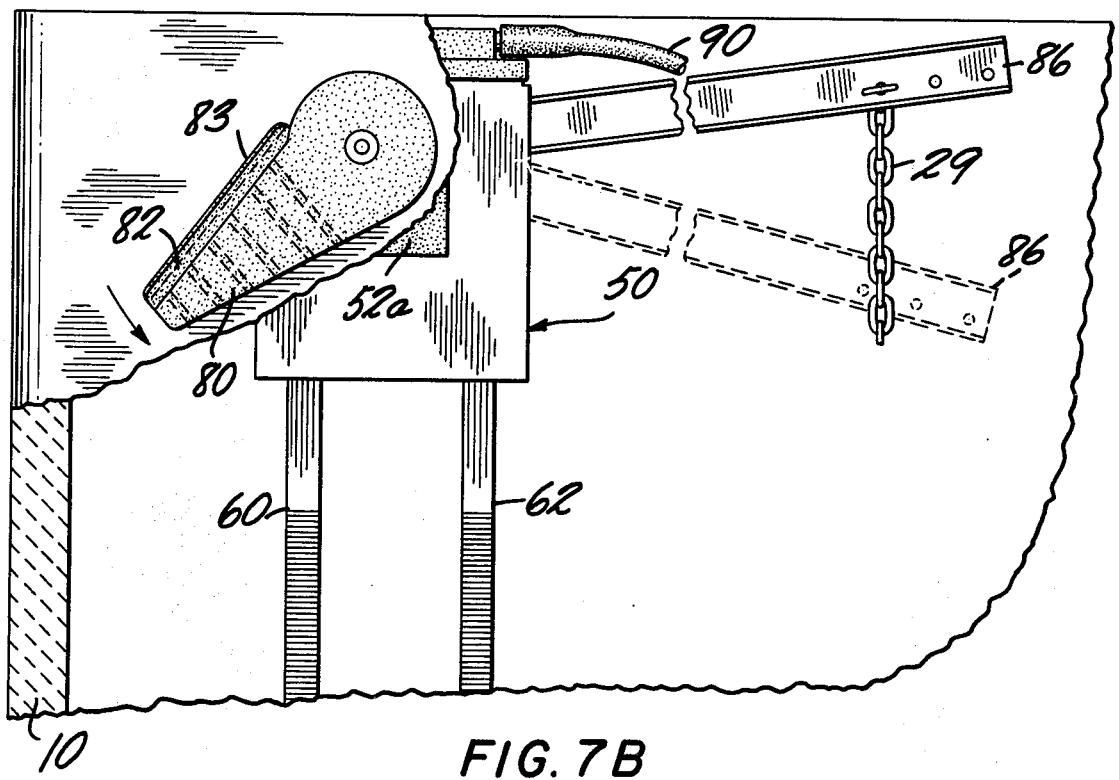

FIGS. 7A and 7B illustrate the movement of the cooperating handles 80, 82 to actuate the flushing mechanism. In a manner to be explained more fully below, downward movement of the handle 80 pivots the trip lever 86 to which the chain 29 is connected, thus lifting the discharge valve 26 and initiating the flushing action. For a small, or low-volume flush, only the handle 80 is depressed; for a full or large volume flush, both the handles 80 and 82 are depressed. In either case, depression of the handle 80 lifts the trip lever 86 to initiate the flushing action.

Figure 3:
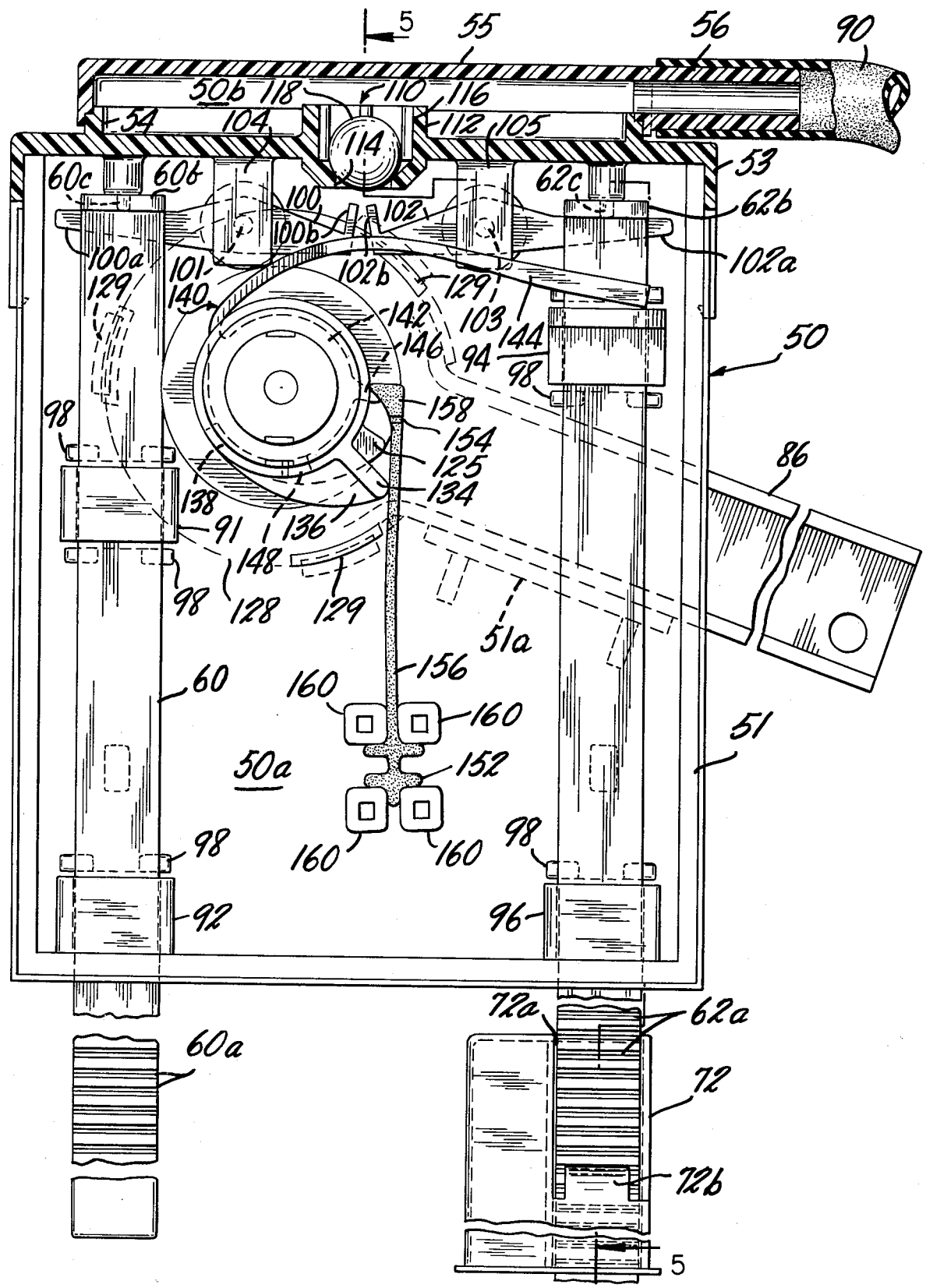
FIG. 3 is an elevational view, in partial section, of the mechanism of the present invention, with the front cover of the housing removed.
Figure 4:
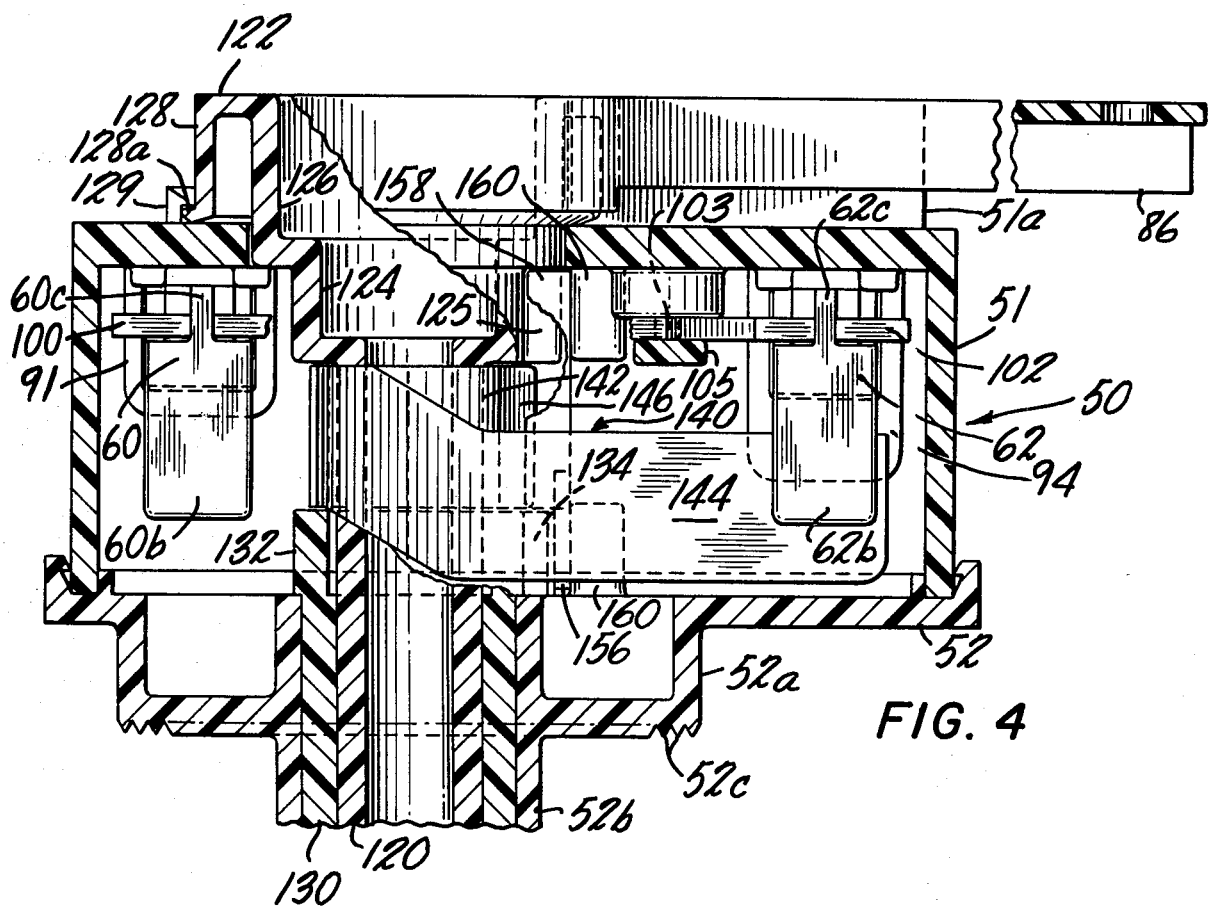
FIG. 4 is a plan view of the mechanism of the invention, in partial section, with the top cover of the housing removed.

Turning now to FIGS. 3 and 4, the housing 50 comprises a generally rectangular chamber divided into a lower compartment 50a and an upper compartment 50b. The lower compartment 50a is formed of a casing 51 having back, side and bottom walls, a front panel 52 and a top closure 53. These three elements may be snapped or otherwise fastened together, after assembly of the internal components, in any convenient fashion. The upper compartment 50b is formed by hermetically sealing a flanged lid 55 to a suitably disposed raised ridge 54 on the top surface of the cover 53. This may be done by cementing or ultrasonic welding.

As seen best in FIGS. 4 and 6, the front panel 52 includes a raised portion 52a extending outwardly of the plane of the front panel and a tubular portion 52b projecting forwardly from the raised portion 52a. The tubular projection 52b has an internal circular bore and a threaded exterior with four orthogonally related flat surfaces formed therein. The diameter across the threaded portions is selected to be just slightly smaller than the diameter of the opening 11 generally provided in the front wall of a flush tank 10 to accommodate the conventional flush handle (see FIG. 6). The front face of the raised portion 52a on the front panel is grooved or striated, 52c, or otherwise roughened to provide a high-friction surface.

As indicated above, the apparatus of the invention will be provided to the home-owner or installer completely assembled except for the flush handles and mounting hardware. Referring to FIG. 6, installation of the unit is effected by inserting the tubular projection 52b through the opening 11 left by removal of the conventional flush handle, from the inside of the tank outwardly. Prior to this insertion, a soft rubber or plastic pad 57, having a hole therethrough sized to receive the tubular projection 52b, is slipped over the tubular projection so that it lies between the inner wall of the tank 10 and the roughened face 52c. A wedging washer 58 having a central opening sized to accommodate the tubular projection 52b and with at least one straight side to engage one of the flats of the projecting member 52b, is slipped over the exterior end and finally, the nut 59 is threaded on the projection 52b. Upon tightening the nut 59, the washer 58 wedges itself in the annular clearance space that will generally be present between the opening 11 in the flush tank and the circumference of the projection 52b, to center it in that opening. As the nut 59 is tightened, the frictional engagement between the front surface 52c of the raised portion 52b, the pad 57 and the inner wall of the tank 10, as well as the wedging portion of the washer 58, will firmly retain the assembly against the inner wall of the tank with the float rods 60, 62 in appropriate vertical orientation, and will resist any tendency of the assembly to rotate as the handles 80, 82 are depressed during flushing actions.

Turning now to FIGS. 3, 4 and 5, the casing 51 includes two pairs of aligned guides 91, 92 and 94, 96, of general U-shaped configuration, secured to the back wall of the casing 51 and sized to accommodate the float rods 60, 62, allowing for free vertical motion therethrough. The float rods 60, 62 preferably are U-shaped in cross section (see FIG. 5) and are kept appropriately spaced from the interior back wall of the casing 51 by bosses 98 projecting inwardly from the wall.

The front surfaces of the float rods 60, 62 (as viewed in FIG. 3) are provided with horizontal grooves 60a, 62a, over an appreciable portion of their lengths extending below the housing 50. As seen in FIGS. 3 and 5, the floats 70, 72 that are mounted on the float rods are in the form of inverted hollow cups provided with vertical channels to accommodate the respective float rods, only channel 72a in float 72 being shown. The front wall of the channel is removed over part of its length leaving an inwardly turned detent portion 72b which engages the grooves on its respective float rod and maintains the float frictionally anchored at the point of engagement. The float 70 is similarly formed, but with its channel on the opposite side; see FIG. 1. The frictional force between the detent on a float and the grooves on its float rod is sufficient to prevent the float from sliding along with the float rod during normal use but allows manual adjustment to desired predetermined heights.

As seen in FIG. 1, the channels for accommodating the float rods are positioned towards the left and right-hand outside surfaces of the respective floats 70, 72 so as to minimize the overall width of the assembly.

The upper end of each of the float rods is provided with a forwardly projecting platform and a rearwardly projecting pin. Thus, as seen in FIG. 5, the float rod 62 includes a forwardly extending platform 62b and the rearwardly extending pin 62c. Similarly, the float rod 60 includes a fowardly extending platform 60b and a rearwardly extending pin 60c (see FIG. 3). Associated with each of the float rods is a valve lever 100, 102 pivoted partway along its length on pins 101, 103, respectively, which project forwardly from bosses formed on the rear surface of the casing 51. Retainers 104, 105, project downwardly from the lower surface of the top closure 53 of the housing and serve to prevent the levers from slipping off their pivot pins.

The remote ends of the respective levers 100, 102, extend outwardly towards the side walls of the housing 50 and are relatively narrow in cross-section. The interior ends of the levers 100, 102, are provided with angled projections 100b, 102b. In assembly, the pins 60c and 62c on the float rods hook over the remote ends of their respective levers so that downward motion of the float rods will cause the levers to pivot. When the float rods are in their uppermost position, the tops of the float rods will raise the remote ends of their respective levers to retain them in the position shown in FIG. 3.

Figure 10A:
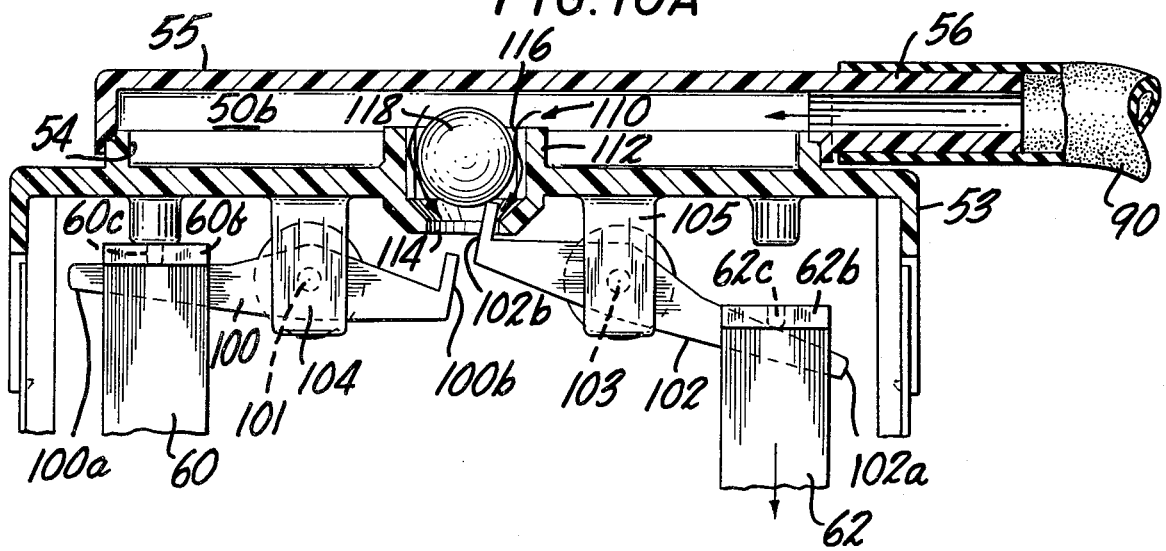
FIGS. 10A, 10B and 10C illustrate the vent means of the invention and its operation in accordance with the invention.
Figure 10B:
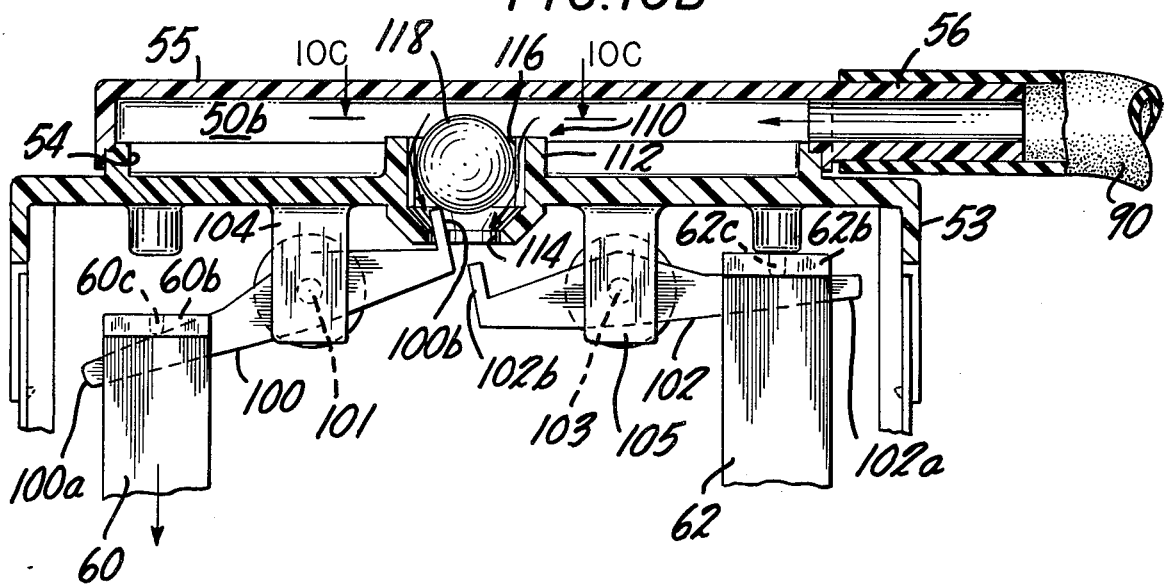
Figure 10C:
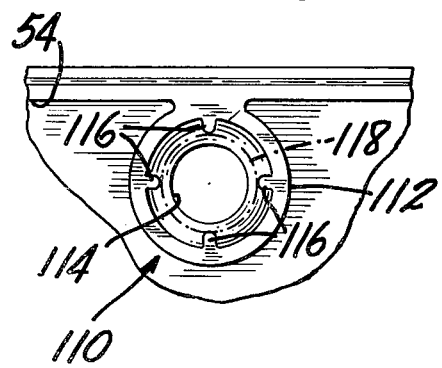

Formed in the closure member 53 of the housing is a ball valve 110 having a tubular upstanding wall 112 and a bottom opening 114 smaller in diameter than the interior of the tubular wall 112 (see FIG. 10C). The interior wall of the tubular portion 112 is provided with vertical splines 116 extending inwardly into the opening. The bottom of the tubular portion is turned inwardly and formed to provide a tight seat for a stopper in the form of a polished steel ball 118, which thereby forms an air valve between the lower compartment 50a and the upper compartment 50b. During the at-rest condition, shown in FIG. 3, the ball 118 is of sufficient weight to remain seated at the bottom of the tube 112 thereby closing the valve 110 and preventing air flow between the compartments 50a and 50b. Projecting outwardly of the lid 55 is a nipple or other connector 56, adapted to receive the tubing 90 in air-tight coupling relationship.

As thus far described, the function of the assembly is as follows. The upper compartment 50b is coupled through the tubing 90 to the air chamber in the discharge valve 26. However, with the ball 18 firmly seated in its valve seat, air cannot escape from the chamber 29a. Should the ball 118 be lifted from its sealing position, air can then escape from the chamber 26a, through the tubing 90 into upper compartment 50b and thence through the open valve 110 into the lower compartment 50a which is not air-tight. Consequently, the air can leak into the surrounding atmosphere.

The interaction of the float rods 60, 62 and the ball valve assembly 110, can best be seen from FIGS. 10A and 10B. In FIG. 10A, the float rod 62 has dropped because the water level in the tank has dropped below the level of buoyancy provided by its associated float 72. Consequently, the remote end of the lever 102 is privoted downwardly, causing its opposite end to raise up and lift the ball from its seat. This provides an air escape passage from compartment 50a to 50b.

Should float rod 62 be unable to drop and the water level continue to fall to a height below the buoyant level of float 70 on float rod 60, the conditions illustrated in FIG. 10B obtain. In that case, the remote end 100a of the lever 100 is moved downwardly causing its opposing end 100b to lift and raise the ball 118 from its seat to provide an air escape path from the chamber 50b.

Turning back to FIG. 1, it will be seen that the floats 70 and 72 are disposed at different levels along their respective float rods. If the float rod 62 was always free to move vertically in accordance with the buoyancy provided by its float 72, the float rod 62 would always drop before the float rod 60, since its float is at a higher level in the tank. The vent valve 110 would then invariably open when the water level reaches the level of float 72, causing the discharge valve 26 to reseat and terminate the flush. This of course, would be the small or low volume flush condition indicated by the line in FIG. 1.

Since however, it is desired to provide for a larger flush, represented by the amount of water discharged from the tank to reach the buoyancy level of the float 70, means are provided to lock up, or prevent downward movement of the float rod 62 when a large volume flush is required, and allow the float rod 60 and float 70 to control the opening of the ball valve 110. This provides a higher volume or large flush, as indicated by the line in FIG. 1. As an alternative, if desired, the float rod 60, float 70 and its associated lever 100 may be eliminated from the assembly, thereby allowing complete emptying of the tank to effect a large flush. The operation of the short or small flush mechanism, including float rod 62 and float 72 and its associated lever and vent valve structure, will remain the same. Likewise, the functioning of the lock-up mechanism for the float rod 62, described below, will be the same whether the float rod 60 is used to control the flush volume or a conventional full tank flush is employed for the large volume flush operation.

The lock-up or control mechanism will now be described with reference to FIGS. 3, 4, 5, 6 and 8.

As best seen in FIGS. 4 and 6, a pair of concentric shafts, 120, 130, extend from outside of the assembly through the bore in the tubular projection 52b and into the interior of the housing 50. Large volume flush handle 82 is keyed to the outer tubular shaft 130 so that the shaft 130 is rotated with depression of the handle. Similarly, small volume flush handle 80 is keyed to the exterior end of the inner tubular shaft 120 so as to rotate it when depressed. A screw 88 retains handle 80 on the outer end of the shaft 120 and serves also to prevent axial displacement of the handle 82. The washer 58 includes a forwardly extending ear 58a which projects into a gap provided in the peripheral wall of the handle 82, to limit the extent of rotational motion that the handle is permitted.

As seen from FIG. 4, the interior shaft 120 extends into and through the housing 50 and is terminated in an expanded portion 122 including a pair of stepped cylindrical portions 124, 126 of successively increasing diameter. A suitable opening is provided in the rear wall of the casing 51 to accommodate freely the diameter of the stepped portion 126. The outer flange portion 128 is provided with a circumferential ridge 128a which is adapted to be slidably engaged by a plurality of angularly separated, arcuate retaining members 129 formed on the back wall of the casing 51 (see FIG. 3). The fit between the ridge 128a and the retaining members 129 allows for easy relative rotation therebetween.

Attached to, or preferably formed integral with, the outer flange portion 128 is the trip lever 86. It will be seen then, that depression of the handle 80 causes counterclockwise rotation of the shaft 120 as well as its expanded portion 122, resulting in the raising of the trip lever 86 from its rest position to its raised or flushing position, as shown in FIG. 7A. The lower or rest position is established by a shelf 51a provided on the rear surface of the casing 51.

The peripheral surface of the step portion 124 is provided with an axial ridge extending radially outward of its surface to form a cam lobe 125, the function of which will be described hereinafter. The position of the cam lobe 125 in the rest condition of the apparatus is shown in FIG. 3.

As indicated above, the outer concentric shaft 130 is keyed to the handle 82 to be rotated therewith. The shaft 130 terminates within the housing 50 in a larger diameter portion 132 on the periphery of which is formed a cam lobe in the form of a finger 134. The radially extending ridge 136 lends structural rigidity to the elongated cam lobe 134. Finally, the larger diameter portion 132 of the shaft 130 includes an axial extending arcuate finger 138, the purpose of which will be described hereinbelow.

Mounted for free rotation about the shaft 120 between its larger diameter portion 124 and the larger diameter terminal portion 132 of shaft 130 is a spring collar member 140. The spring collar member 140 includes a hub portion 142 having an inner bore sufficiently large to allow it to slip freely about the shaft 120 and a spring arm 144 which extends outwardly from the hub 142 in a curved, approximately tangential path. In plan view, the spring arm is offset from the hub member in dog-leg fashion so that the remote end of the spring arm is close to the interior wall of the front cover 52 of the housing. The length of the spring arm 144 is such as to extend beyond the path of the float rod 62 towards the edge of the casing 51. As seen from FIGS. 3, 4 and 5, the end of the spring arm 144 is disposed between the lower surface of the platform 62b at the upper end of the float rod 62 and the upper surface of a horizontally extending platform formed on the rod guide 94.

Extending axially along the hub 142 of the spring collar 140, and projecting generally radially therefrom is a finger or cam lobe 146. Also extending axially along the hub 142 and projecting outwardly from its periphery is a spline or detent 148.

Figure 8:
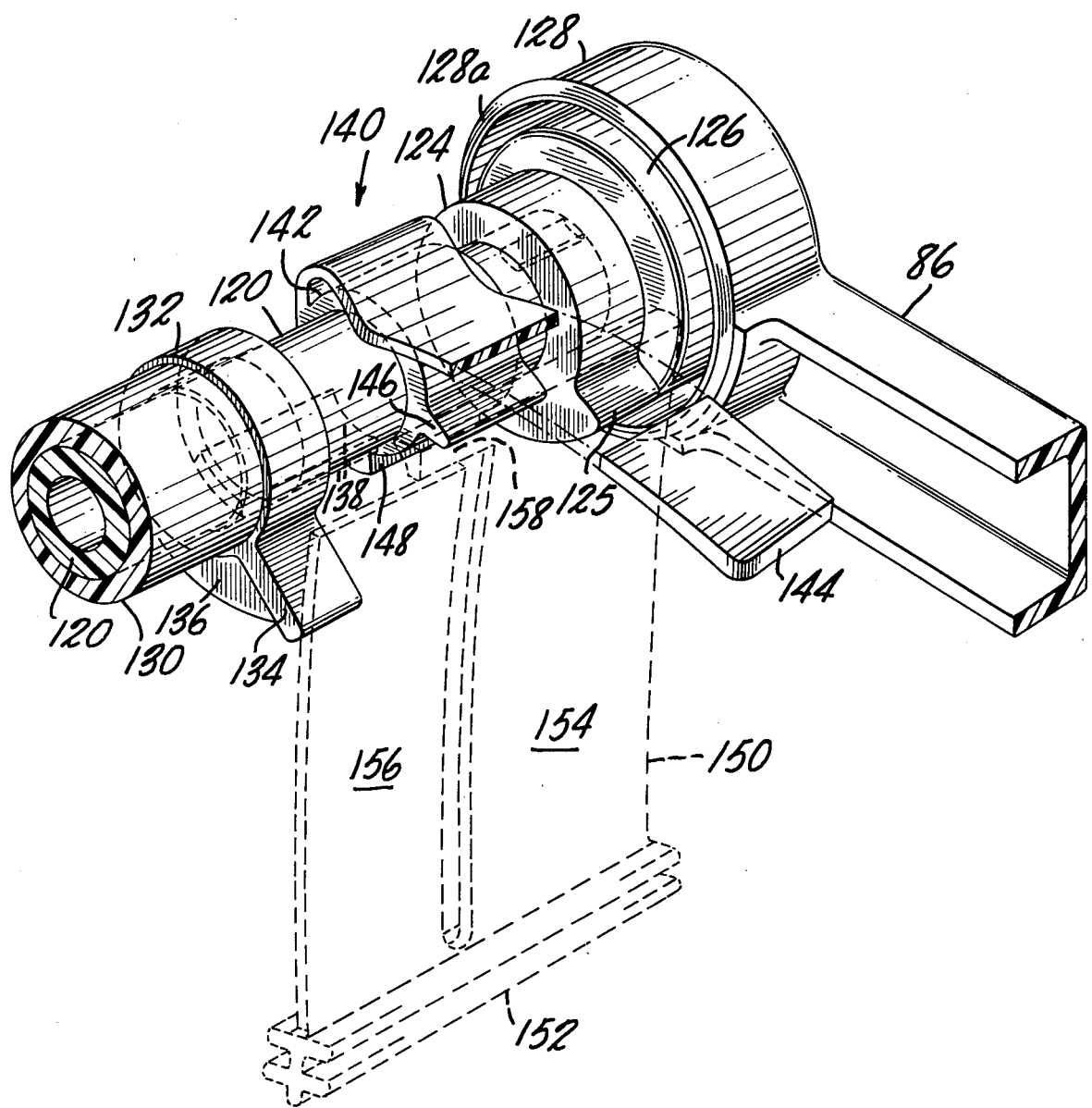
FIG. 8 is a perspective view of the cam line and spring assembly of the invention.

The interrelationship of the shafts 120 and 130, with their respective expanded portions and cam lobes, and the spring collar 140 is best seen from the perspective view of FIG. 8, which has been drawn somewhat out of scale to better illustrate the structure. As shown therein, the detent 148 on the periphery of the hub portion 142 of the spring collar 140 is disposed so as to be engageable by the arcuate finger 138 extending axially from the enlarged terminal portion 132 of the shaft 130. Thus, as the shaft 130 is rotated in a counterclockwise direction upon depression of the large flush handle 82, finger 138 engages detent 148 to rotate the spring collar 140 about the shaft 120 with the consequent lifting of the spring arm 144.

A split or two-element leaf spring member 150 is secured between the front and rear walls of the housing 50 to cooperate with the cam line formed of the cam members on the shafts 120, 130 and the spring collar 140. Turning to FIG. 8, leaf spring 150 (shown in dotted line for clarity) is formed of two spring sections 154, 156 extending upwardly from a common base portion 152. Spring 154 is longer than spring section 156 and includes a detent portion 158 along its upper edge that extends partially over the uppermost edge of the spring 156. The base portion 152 is shaped to fit between two clusters of inwardly extending posts 160, one cluster extending inwardly from the back wall of the casing 51, the other from the interior wall of the front cover 52. Each of the clusters consist of four posts 160 disposed to snugly receive the ends of the base portion 152 of the leaf spring such that when the front cover 52 is assembled to the casing 51, with the spring base 152 already inserted in the cluster in the casing 51, the spring 150 will be firmly retained within the housing against movement in any direction. By this means, the spring member 150 is rigidly held with the spring leaves 154, 156 extending generally vertically upward; see FIGS. 3 and 5.

The spring leaves 154, 156, cooperate with the cam lobes on the shafts 120, 130 and the spring collar 140 to enable the small and large volume flush selection capability of the invention to be readily effected. The precise manner of this cooperation will become evident from the following description of operation of the assembly heretofore described.

The operation of the cam and spring system can best be understood by particular reference to FIGS. 3, 8, 9A, 9B and 9C.

In the at-rest position, with the tank full of water, the lobe 134 of the large cam shaft 130 is in its lower position in contact with the short spring 156 of the spring member putting it under slight tension to maintain the handle 82 in its upper position. Similarly, the lobe 125 on the small cam shaft 120 is in its lower position so that no tension is applied to the large spring 154 of the spring member. With the large cam shaft 130 at its rest position, the spring collar 140 is in position with its arm 144 resting on the ledge extending outwardly of the float rod guide 94 (FIG. 5). Similarly, the cam lobe 146 and detent 148 are resting at their extreme clockwise position. Both of the float rods 60, 62 are in their uppermost position and their respective levers 100, 102 are pivoted below and out of contact with the vent ball 118.

To obtain a small or low volume flush, the main flush handle 80 is depressed in the usual manner. This rotates, in a counterclockwise direction, the small cam shaft 120 which extends through the housing and is integral with the discharge valve trip lever 86. The direction of rotation is such as to raise the trip lever from its ledge 51a and thus lift the discharge valve from its seat to initiate the flushing action. Since the large cam shaft 130 is not rotated in this instance, the axially extending finger 138 does not engage the detent 148 and the spring collar is not rotated from its rest position. The float rod 62 thus is free to fall until its platform 62b reaches the top of the spring arm 144 of the spring collar.

As the water level drops in the tank during the flushing action, the float rod 62 remains in its upper position as long as its associated float 72 is below the water level. When the water level drops below the buoyant level of the float, the float rod begins to drop with the water level. As it drops, the pin 62c at the upper end pulls down on the end of the lever 102 moving the opposite end of the lever upwardly. After a short downward movement of the float rod, the lefthand end of the lever is moved upward sufficiently to raise the ball 118 in the vent valve 110 above its seat, thereby opening an air passage from the chamber 26a of the discharge valve, through the tubing 90, into the upper compartment 50b of the housing and then into the lower compartment 50a of the housing, from which it can escape into the surrounding atmosphere. This permits water to enter the air chamber in the discharge valve, causing it to reseat immediately and stop the discharge action (see FIG. 10A).

Figure 9A:
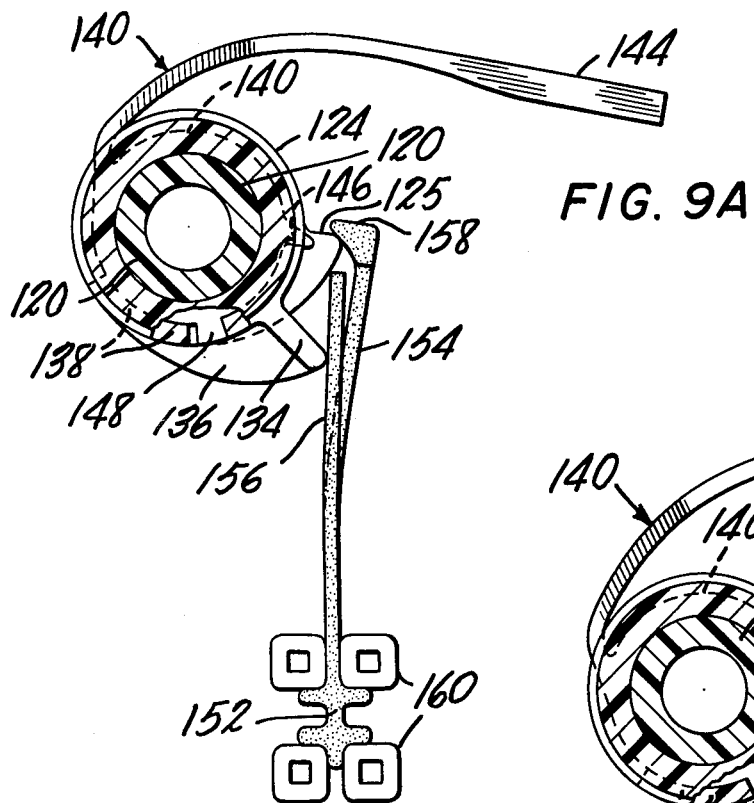
FIGS. 9A, 9B and 9C are end views of the cam line and spring assembly of FIG. 8, illustrating its operation in the partial and full flush modes.

During the rotation of the small cam shaft as the flush handle is depressed, the lobe 125 on its cam 124 rotates counterclockwise, initially coming into contact with the large spring 154 of the spring member and displacing it to the right, as seen in FIG. 9A. This moves the detent portion 158 of the large spring sufficiently to the right so that the spring collar 140 can rotate freely. If the spring collar had been in its locked-up position, the displacement of the spring 156 would release it from that position, as will be described below.

After depression and release of the main flush handle 80, the weight of the trip lever 86 and the action of the large spring 154 on the cam lobe 125 act to return the flush handle to its normal position.

Figure 9B:
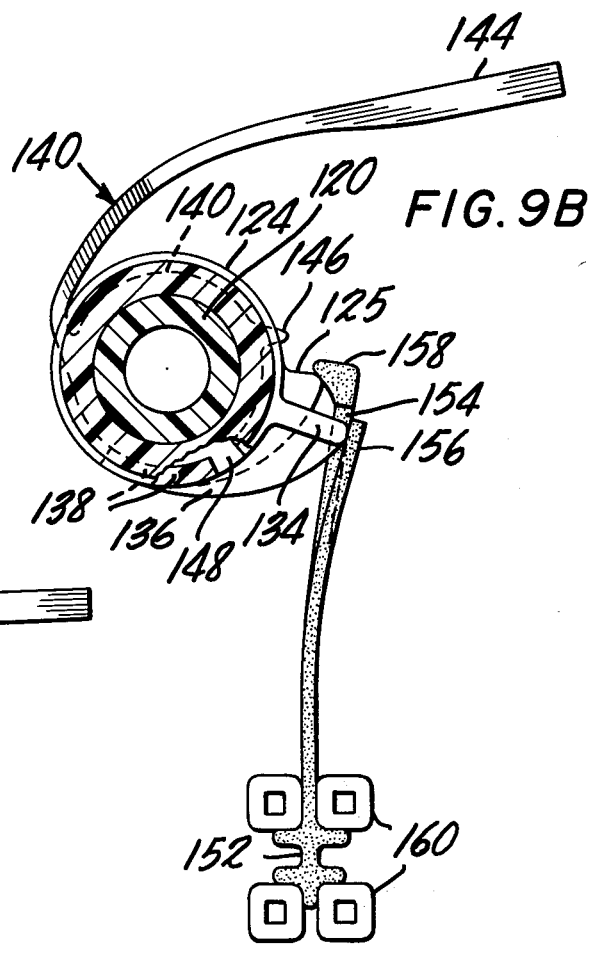

For a large volume flush operation, the auxiliary long flush handle 82 is depressed. Since the lip 83 on the auxiliary flush handle overlaps the main flush handle, depression of the former also depresses the latter, thereby rotating both the large cam shaft 130 and the small cam shaft 120, in unison, in a counterclockwise direction. Rotation of the large cam shaft causes its axially projecting finger 138 to engage the detent 148 extending along the lower periphery of the spring collar, thereby rotating it in the counterclockwise direction. Prior to appreciable rotation of the spring collar, however, the cam lobe 125 on the small cam shaft had already come into engagement with the large spring 154, moving its detent portion 158 to the right, away from the cam shaft assembly. This permits the radially extending lobe 146 on the spring collar to clear the detent portion 158 of the large spring, thus permitting the entire spring collar to rotate counterclockwise. The spring arm 144 thus moves upwardly into engagement with the lower surface of the platform 62b at the top of the float rod 62. The relative positions of the cam lobes and springs at this time are shown in FIG. 9B.

Figure 9C:
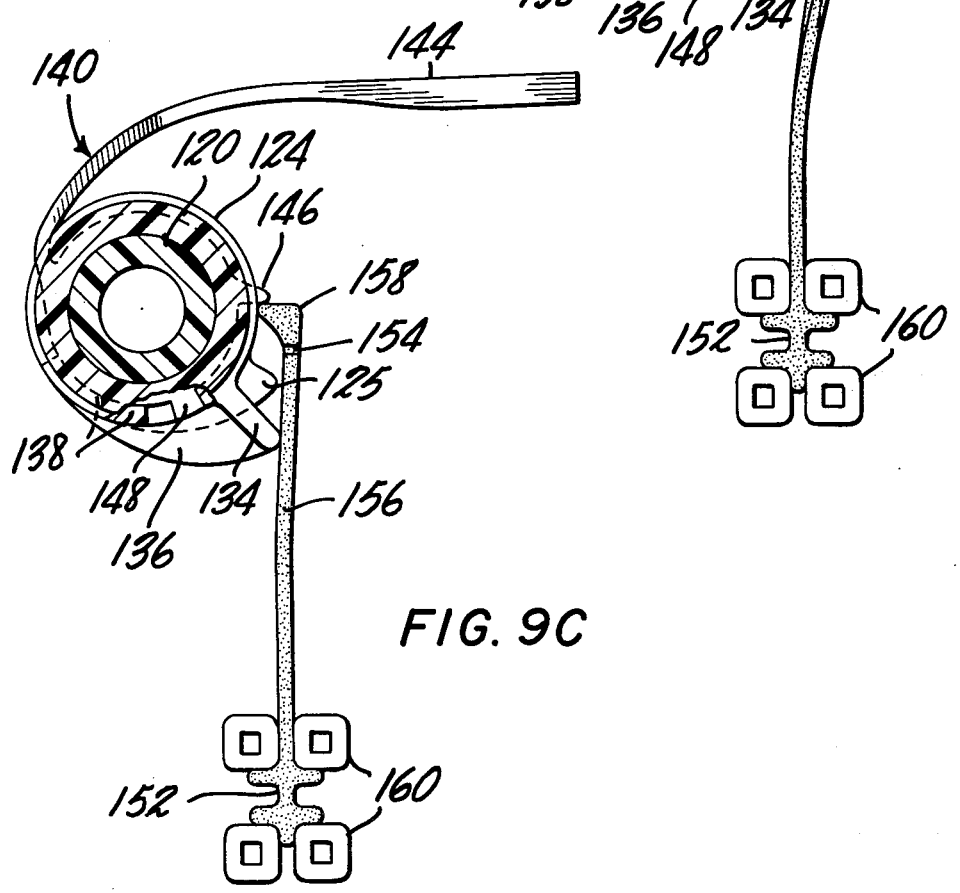

When the flushing handles are released, the small spring 156 acting on the lobe 134, together with the weight of the trip lever 86 and the action of spring 154 on the cam lobe 125, return the shafts 120, 130 and their respective flush handles to their rest positions. However, the spring collar 140 stays in its rotated position because its projecting cam lobe 146 is now above the detent portion 158 of the large spring which prevents its rotation in the clockwise direction. This alignment is illustrated in FIG. 9C.

As the water level in the tank falls, it first reaches the float level established by the float 72 on the float rod 62. The float rod cannot drop when the water level drops further, however, because the spring arm 144 bearing up against the underside of the platform 62b at the top of the rod prevents it from doing so. Thus, the low volume flush float rod 62 is rendered ineffective and cannot actuate its lever 102 to open the vent 110.

When the water level drops below the buoyancy level of the float 70 on the float rod 60, that rod is free to drop with its float, thereby actuating its associated lever 100 to open the vent, as in FIG. 10B, thereby causing the discharge valve to reseat and terminate the flush.

As indicated above, depression of the short flush handle 80 and rotation of its associated cam shaft 120, cause its cam lobe 125 to engage the large spring 154 and move it to the right beyond possible engagement with the lobe 146 on the spring collar 140. If the spring collar had been in its uppermost or large flush position as a result of prior actuation of handle 82, the disengagement of the detent portion 158 of the large spring would permit the lobe 146 to clear the detent and the spring collar to rotate in the clockwise direction, thereby dropping the arm 144 from engagement with the platform 62b on the float rod to its lower position on the ledge of the float rod guide 94. Thus, the float 72 and float rod 62 will respond to produce a small flush.

The arrangement is such that the user may readily discern the two possible handle actuations and avoid unnecessary water use. To enhance the distinctions between the handles, they may be of different colors and may bear prominent legends such as "SOLID" and "LIQUID". For similar purpose, the cam arrangement is such that the lock-up of the low volume flush float rod is released at the beginning of the subsequent flushing operation, regardless of whether its intended to be a long or short flush. If a long flush is intended, the spring collar will again lock up at the beginning of the cycle. Thus, there can be no accidental lock-up of the mechanism in the large volume flush position.

The variable volume flush tank assembly of the present invention may be installed as original equipment by toilet manufacturers, and is also uniquely adapted for addition to conventional flush tank systems already installed. The construction lends itself to packaging in completely assembled form for easy installation by the home-owner or plumber. All that is required is that the existing flush handle be removed, usually by unscrewing a single nut on the inside wall of the tank, along with the trip lever. The assembly is then inserted by extending the tubular projection 52b through the opening in the tank wall left by the removal of the original flush handle, with the gasket 57 in place, inserting the washer 58 and tightening up the nut 59. The handles are then secured to the end of the assembly as shown in FIG. 6. Finally, the chain 29 from the discharge valve is hooked into one of the holes provided near the outer end of the trip lever 86 and the tubing 90 slipped over the nipple 56 and either punched through the discharge valve 26 or attached to a suitable fitting provided thereon. In the latter instance, it would be convenient to provide, along with the control assembly, a replacement discharge valve having a fitting designed to couple to the tubing 90.

The floats 70 and 72 are then suitably adjusted to provide the required flush volumes. By way of example, a typical flush tank holds six gallons of water, all of which would be discharged during a conventional flush. With the present invention installed, the float 72 could be adjusted, for the small volume flush, to a height which would provide approximately a one and three quarter gallon discharge, adequate for liquid waste. The large volume setting, established by the position of the float 70, could be adjusted to provide a three and one half gallon discharge, suitable for solid waste. In either case, after a flush is completed, the tank is filled to its regular level as established by the float 15 and valve 13 and the mechanism of the invention limits only the extent to which the tank is emptied during a flush. Thus, maximum water pressure is available for all flush volumes, providing peak flushing effect even with low volume discharges.

In its preferred form, all of the parts of the structure of the invention may be formed of suitable plastic, such as an acetal (aldehyde polymer) known as Delrin, manufactured by E. I. DuPont deNemours & Company of Wilmington, Delaware. This material is characterized by high strength, rigidity, resilience and toughness, as well as resistance to corrosion and wear. Moreover, it lends itself to high precision molding and is dimensionally stable. Other materials exhibiting the requisite characteristics may of course be used without departing from the inventive concepts.

The invention has been shown and described in preferred form and by way of example only, and different variations and modifications can be made therein within the spirit of the invention. The invention, therefore, is not intended to be limited to any particular form or embodiment except insofar as such limitations are expressly set forth in the claims.

We claim:

1. For use in a toilet flush tank normally filled with flushing water to a prescribed level, said tank having a flush discharge opening at the bottom and a discharge valve for closing the discharge opening, said discharge valve having an air chamber open at the bottom and adapted to be lifted to flush water from the tank through the discharge opening, flush control apparatus for regulating the amount of water flushed from the tank comprising, a housing adapted to be mounted within said flush tank above the normal water level in said tank, vent means in said housing, air passage means coupling said air chamber in said discharge valve to said vent means, and water level responsive means for opening said vent means when said water level falls to a predetermined height below said normal level, whereby air trapped within said chamber when the discharge valve is lifted to initiate a flushing operation retains the discharge valve in floating condition until the water level in the tank falls to said predetermined height at which said water level responsive means opens said vent means to permit the air entrapped in said chamber to escape, whereupon water enters the chamber to cause the discharge valve to drop to its seated position and close the discharge opening.

2. The flush control apparatus of claim 1 wherein said water level responsive means includes at least one float controlled member movable vertically in response to changes of water level in said tank, and means responsive to downward movement of said float controlled member when the water level falls to said predetermined height to open said vent means.

3. The flush control apparatus of claim 2 further comprising manually actuatable means for selectively preventing downward movement of said float control member whereby said vent means is not opened when the water level falls to said predetermined height.

4. The flush control apparatus of claim 3 wherein there are provided two float controlled members movable vertically in response to changes of water level in said tank, and means responsive to downward movement of either of said float controlled members when the water level falls to respective predetermined heights associated with said members to open said vent means, said predetermined heights being different for each of said members.

5. The flush control apparatus of claim 4 wherein said vent means comprises an opening in communication with said air passage means and the surrounding atmosphere and a stopper normally closing said opening, and said means responsive to downward movement of either of said float control members comprising lever means actuated by said downward movement to displace said stopper from its closing position.

6. For use in a toilet flush tank normally filled with flushing water to a prescribed level, said tank having a flush discharge opening at the bottom and a discharge valve for closing the discharge opening, said discharge valve having an air chamber open at the bottom and adapted to be lifted to flush water from the tank through the discharge opening, flush control apparatus for regulating the amount of water flushed from the tank comprising, means adapted to be manually actuatable from outside said tank and to extend into said tank for lifting said discharge valve to initiate a flushing operation, a housing adapted to be mounted within said flush tank above the normal water level in said tank, said housing having first and second compartments, vent means in said housing including an opening interconnecting said first and second compartments and a stopper normally closing said opening, air passage means coupling said air chamber in said discharge valve to said first compartment, and water level responsive means for displacing said stopper from its normally closing position to open said vent means when the water level in said tank falls to a predetermined height below said normal level, thereby to permit air entrapped in said discharge valve air chamber to escape and cause the discharge valve to close the discharge opening and terminate the flushing operation.

7. The flush control apparatus of claim 6 wherein said first compartment is air tight when said stopper is in its closing position and said second compartment is in communication with the atmosphere.

8. The flush control apparatus of claim 6 wherein said water level responsive means includes at least one float controlled member movable vertically in response to changes of water level in said tank, and means responsive to downward movement of said float controlled member when the water level falls to said predetermined height to open said vent means.

9. The flush control apparatus of claim 8 wherein said float controlled member comprises a vertically oriented elongated rod having its upper end extending into said second compartment of said housing and retained therein for limited vertical movement relative thereto, and a float adjustably positionable along the rod beneath said housing below said normal water level.

10. The flush control apparatus of claim 9 wherein said means responsive to downward movement of said float controlled member comprises lever means engaged by the upper end of said rod and actuated by downward movement of said rod to displace said stopper and open said vent means.

11. The flush control apparatus of claim 10 wherein said lever means comprises an elongated member pivotally mounted between its ends in said second compartment, the upper end of said rod engaging said lever member adjacent one end thereof, the other end of said lever member thereby being effective to move upwardly and displace said stopper when said one end moves downwardly with said rod.

12. The flush control apparatus of claim 11 wherein said vent means comprises means defining a generally vertical tubular passage, the upper end of which opens in said first compartment and the lower end of which opens in said second compartment, the opening at the lower end of said passage being circular and narrower in diameter than the rest of said passage, and a spherical member of a size and weight to move freely within said passage and normally to seat in said lower opening to provide airtight closure thereof.

13. The flush control apparatus of claim 6 wherein said water level responsive means includes a pair of float controlled members, each of which comprises a vertically oriented elongated rod having its upper end extending into said second compartment of said housing and retained therein for limited vertical movement, lever means engaged by the upper end of each of said rods and actuated by downward movement of either of said rods to displace said stopper to open said vent means, and a pair of floats respectively adjustably positionable along said rods below said housing.

14. The flush control apparatus of claim 6 wherein said water level responsive means includes at least one float controlled member movable vertically in response to changes of water level in said tank and means responsive to downward movement of said float controlled member when the water level falls to said predetermined height to open said vent means, and wherein said manually actuatable means further comprises means for selectively preventing downward movement of said float controlled member, whereby said vent means is not opened when the water level falls to said predetermined height.

15. The flush control apparatus of claim 14 wherein said manually actuatable means includes a first shaft extending into said second compartment of said housing, the free end of said shaft adapted to extend outside of said flush tank, means coupled to the other end of said first shaft and to said discharge valve for lifting said discharge valve upon rotation of said first shaft, a second shaft concentrically surrounding said first shaft and extending from outside of said flush tank into said second compartment of said housing, said first shaft extending into said housing beyond said second shaft and being rotatable relative thereto, and locking means operatively associated with said first and second shafts and said float controlled member to prevent downward movement of said float rod in response to simultaneous rotation of said first and second shafts.

16. The flush control apparatus of claim 15 further comprising first handle means for enabling manual rotation of said first shaft including a hub portion adapted to be coupled to said first shaft outside of said tank and an arm portion extending radially from said hub portion, and second handle means for enabling manual rotation of said second shaft including a hub portion adapted to be coupled to said second shaft outside of said tank and inwardly of said first handle means, and an arm portion having an outwardly projecting lip along its length, said first and second handle means being aligned on their respective shafts such that the lip of the arm portion of said second handle partially overlays the arm portion of said first handle, whereby downward manual pressure on the arm portion of said first handle causes rotation only of said first shaft while downward manual pressure on the arm portion of said second handle also applies pressure to the arm portion of said first handle and results in rotation of both said first and second shafts.

17. The flush control apparatus of claim 15 wherein said locking means comprises a generally tubular hub mounted on said first shaft within said housing and adjacent the interior end of said second shaft, an elongated arm extending generally tangentially outward of the periphery of said hub, means coupling said second shaft to said hub to rotate the latter upon rotation of said second shaft, said arm being raised thereby, detent means for retaining said hub and arm in their rotated positions upon subsequent reverse rotation of said second shaft to its initial position, and means at the upper end of said float rod for engaging said arm such that with said arm retained in its raised position, the float rod is prevented from dropping.

18. The flush control apparatus of claim 17 wherein said detent means comprises a generally flat spring member mounted in said second compartment, the plane of said spring member being generally parallel to and displaced from the axis of said shafts, said spring member having first and second vertically extending sections fixed at their lower ends and being free to flex at their upper ends, said second spring section having a lip along its free edge extending towards said shafts, and an axial ridge on the peripheral surface of said tubular hub extending radially outwardly thereof and adapted to be engaged by the lip on said second section of said spring member.

19. The flush control apparatus of claim 18 further comprising cam means extending axially along the peripheral surface of said second shaft within said housing, said cam means extending radially outwardly to engage the first section of said spring member near its upper end when said second shaft is rotated, thereby deflecting said first spring section which tends to rotate said second shaft in the opposite direction.

20. The flush control apparatus of claim 19 further comprising cam means extending axially along the peripheral surface of said first shaft within said housing, said cam means extending radially outwardly to engage the second section of said spring member near its upper end when said first shaft is rotated and being of sufficient radial extent to deflect said second spring section such that its lip is moved out of possible engagement with the axial ridge on said tubular hub.

* * * * *